United States Patent [19]

Hofmann et al.

[11] 3,844,823
[45] Oct. 29, 1974

[54] METHOD FOR THE PRODUCTION OF CERAMIC BODIES WITH CONTROLLED SURFACE RESISTIVITY

[75] Inventors: Horst Hofmann; Helmut Katz, both of Munich, Germany

[73] Assignee: Siemens Aktiengesellschaft, Berlin and Munich, Germany

[22] Filed: Sept. 25, 1972

[21] Appl. No.: 291,712

[30] Foreign Application Priority Data
Oct. 19, 1971  Germany.............................. 2152011

[52] U.S. Cl.......... 117/119, 117/123 B, 117/124 C, 117/169 R, 117/229
[51] Int. Cl.............................................. B44d 1/02
[58] Field of Search............ 117/119, 123 B, 169 R, 117/229, 124 C

[56] References Cited
UNITED STATES PATENTS
3,074,143  1/1963  Smith.............................. 117/123 B
3,189,476  6/1965  Cowan................................ 117/229
3,215,555  11/1965  Kray................................ 117/123 B Primary Examiner—William D. Martin
Assistant Examiner—Janyce A. Bell
Attorney, Agent, or Firm—Hill, Gross, Simpson, Van Santen, Steadman, Chiara & Simpson

[57] ABSTRACT

A method for the production of controlled surface resistivity on a ceramic body such as alumina in which the ceramic body is coated with an aqueous metal salt solution containing lithium poly-molybdate, lithium fluoride, a binding agent and having suspended therein a high melting oxide. The resulting coating is sintered onto the body in a dry, inert protective gas atmosphere so as to reproducibly achieve resistivity values within a wide range.

12 Claims, No Drawings

METHOD FOR THE PRODUCTION OF CERAMIC BODIES WITH CONTROLLED SURFACE RESISTIVITY

BACKGROUND OF THE INVENTION

1. Field of the Invention

This invention is in the field of providing controlled surface resistivities on a ceramic body, and involves coating a ceramic body such as alumina or the like with an aqueous salt solution containing lithium poly-molybdate and lithium fluoride, together with a binding agent and having dispersed therein a high melting oxide. After application, the coating is sintered to produce a surface having controlled resistivity properties.

2. DESCRIPTION OF THE PRIOR ART

The recent advances in improving metal to ceramic bonding has greatly broadened the field of applicability of aluminum oxide type ceramics, particularly for use as elements in particle accelerators. However, heretofore such ceramic bodies could not be provided with coatings which had carefully controlled resistivity properties. In addition, the coating of such ceramic bodies frequently involved the use of vacuum or evaporation apparatus which is time-consuming and expensive. The coated ceramic products were furthermore not entirely satisfactory from the standpoint of physical properties, particularly in their resistance to abrasion.

SUMMARY OF THE INVENTION

The present invention provides a method for applying coatings of controlled surface resistivity to ceramic bodies which involves an application of an aqueous solution to the body by means of spraying or dipping or the like, the solution containing lithium poly-molybdate, lithium fluoride, and a binding agent. The solution also contains a suspension of a high melting oxide. The succeeding sintering treatment of the coating results in the formation of spinels and semiconductor oxides due to solid phase reactions, which may be accompanied by the presence of metallic type inclusions, depending on the concentration and the binding agent used in the solution. The subsequent sintering produces a coating which can vary in resistivity from about 10 to $10^{14}$ ohms per square, and is usually on the order of $10^7$ to $10^{11}$ ohms per square.

DESCRIPTION OF THE PREFERRED EMBODIMENTS

In accordance with the present invention, a ceramic base consisting of alumina or similar insulating ceramic materials is, after the usual cleaning process, treated with an aqueous metal salt solution containing lithium poly-molybdate, lithium fluoride and a water soluble polymeric binding agent such as methyl cellulose. To this solution is added a finely divided suspension of one or more refractory oxides such as aluminum oxide, beryllium oxide, magnesium oxide, or the like. The addition of small amounts of lithium fluoride to the metal salt solution results in improved wetting properties, and enhanced solid phase reaction with the ceramic surface.

Broadly speaking, for every 100 ml. of deionized water, there are included 15 to 35 grams of lithium poly-molybdate, from 0.7 to 10 grams of water soluble polymeric binding agent, and from 5 to 30 grams of the high melting oxide particles. The amount of lithium fluoride is at or about its saturation concentration.

Typically, for every 100 ml. of deionized water, there is dissolved 32 grams of lithium poly-molybdate having the formula 2 $Li_2O_3 \cdot 3MoO_3$ together with 80 mg. of lithium fluoride. In addition, there is added about 4 to 6 ml. of a 10 percent aqueous solution of methyl cellulose or other organic binding material. Suspended in this solution is one or more of the previously mentioned refractory metal oxides in a particle size having an average of about 5 microns in an amount of about 10 to 20 grams.

The suspension of refractory metal oxide particles in the salt solution can be applied to the ceramic base by means of dipping or a spray gun or the like, and is typically applied to the base in a thickness of about 15 microns.

The addition of the refractory metal oxide in very finely divided form provides a very effective activator in that it causes a substantial amount of lattice interference, or defect structure, causing an increased solid phase reaction with the underlying ceramic base. Due to the addition of the refractory oxides, additional solid phase reactions occur at the ceramic surface during the subsequent sintering process, resulting in a weakening of the ceramic surface which favors the formation of spinels or semiconductive oxides. The sintering also results in the formation of metal islands which appear in the coating as metallic inclusions. Depending upon the number of metallic inclusions present, a decrease of the electrical conductivity and thus an increase in the surface resistivity will be obtained in a controlled manner.

The sintering conditions are those commonly employed in the production of metallic-ceramic compositions, and involve sintering temperatures of about 1,000° to 1,400° C., with 1,300° C. being preferred. The sintering is carried out in the presence of a dry inert protective atmosphere such as hydrogen, nitrogen, cracked gases, argon, neon, helium or the like. Sintering times of from 30 to 90 minutes can be employed under these conditions.

In place of the pure oxide materials, materials which are already present in spinel form such as Mg $Al_2O_4$ can also be employed to advantage.

A particularly effective metal oxide additive results from the calcining of a hydrolyzed aluminum ethylate, resulting in the formation of an aluminum oxide which is predominantly in the corundum (alpha alumina) form.

The process of the present invention thereby provides an economical and highly effective means for achieving a coating on a ceramic body which has reproducible resistivity characteristics.

We claim as our invention:

1. A method of producing a surface of controlled resistivity onto a ceramic body which comprises applying an aqueous solution containing lithium poly-molybdate, lithium fluoride and a water soluble organic binding agent and having a high melting oxide selected from the group consisting of aluminum oxide, beryllium oxide and magnesium oxide dispersed therein to a ceramic body, drying said body, and sintering the resulting coating onto said body in a dry inert protective gas atmosphere, the amount of said oxide being dependent on the resistivity to be achieved in said surface.

2. The method of claim 1 in which said solution is applied by dipping.

3. The method of claim 1 in which said solution is applied by spraying.

4. The method of claim 1 in which said high melting oxide is present in the form of particles having an average grain size of about 5 microns.

5. The method of claim 1 in which said high melting oxide is in a lattice-interfered state.

6. The method of claim 1 in which said coating is applied to a thickness of about 15 microns.

7. The method of claim 1 in which said sintering is carried out at a temperature of from 1,000° to 1,400° C.

8. The method of claim 7 in which said sintering is carried out for a time ranging from 30 to 90 minutes.

9. The method of claim 1 in which said solution contains for every 100 ml. of deionized water, from 15 to 35 grams of lithium poly-molybdate, from 0.7 to 10 grams of binding agent, from 5 to 30 grams of high melting oxide and an amount of lithium fluoride up to saturation.

10. The method of claim 1 in which said solution contains for every 100 ml. of deionized water, about 32 grams of lithium poly-molybdate, about 80 mg. of lithium fluoride and 4 to 6 ml. of a 10 percent aqueous solution of methyl cellulose.

11. The method of claim 1 in which said high melting oxide is in the form of a spinel.

12. The method of claim 1 in which said high melting oxide is a calcined hydrolyzed aluminum ethylate consisting predominantly of alpha alumina.

* * * * *